United States Patent [19]

Weisfeld

[11] 3,962,021

[45] June 8, 1976

[54] TRANSPRINTING, BONDING OR FUSING MACHINES

[76] Inventor: David Weisfeld, 3 Etheldene Ave., London N.10, England

[22] Filed: Mar. 19, 1974

[21] Appl. No.: 452,520

[30] Foreign Application Priority Data

Mar. 22, 1973 United Kingdom ............... 13962/73
Aug. 22, 1973 United Kingdom ............... 39878/73

[52] U.S. Cl. ................................ 156/499; 156/541; 156/555; 156/582; 250/319; 425/373

[51] Int. Cl.$^2$ ....................... B29J 5/00; B32B 31/20

[58] Field of Search ................... 156/582, 499, 62.2, 156/540, 541, 555; 425/83, 373; 101/467, 470, 471; 250/318, 319

[56] References Cited

UNITED STATES PATENTS

| | | | |
|---|---|---|---|
| 2,442,443 | 6/1948 | Swallow | 425/373 |
| 2,916,622 | 12/1959 | Nieset | 250/319 |
| 2,971,218 | 2/1961 | Bierer | 425/373 X |
| 3,039,137 | 6/1962 | Smith et al. | 425/373 X |
| 3,065,467 | 11/1962 | Prevost | 250/319 |
| 3,144,679 | 8/1964 | Slemmons | 425/373 X |
| 3,202,818 | 8/1965 | Thomiszer | 250/319 |
| 3,224,354 | 12/1965 | Dietzgen et al. | 250/319 |
| 3,416,984 | 12/1968 | Chavannes et al. | 156/498 |
| 3,923,583 | 12/1975 | Bianchini | 156/499 X |

*Primary Examiner*—William A. Powell
*Assistant Examiner*—M. G. Wityshyn
*Attorney, Agent, or Firm*—Young & Thompson

[57] ABSTRACT

A transprinting, bonding or fusing machine having a drum, a pressure roller arranged in contact with the surface thereof, an endless belt passing between the pressure roller and the drum and extending a part way around the surface of the drum, the drum being driven through the pressure roller. Electric heating elements are arranged exterior to the drum surface to direct heat on that part of the endless belt which is in contact with the drum surface, the material to be printed, bonded or fused passing between the endless belt and the surface of the drum.

8 Claims, 4 Drawing Figures

Fig. 1.
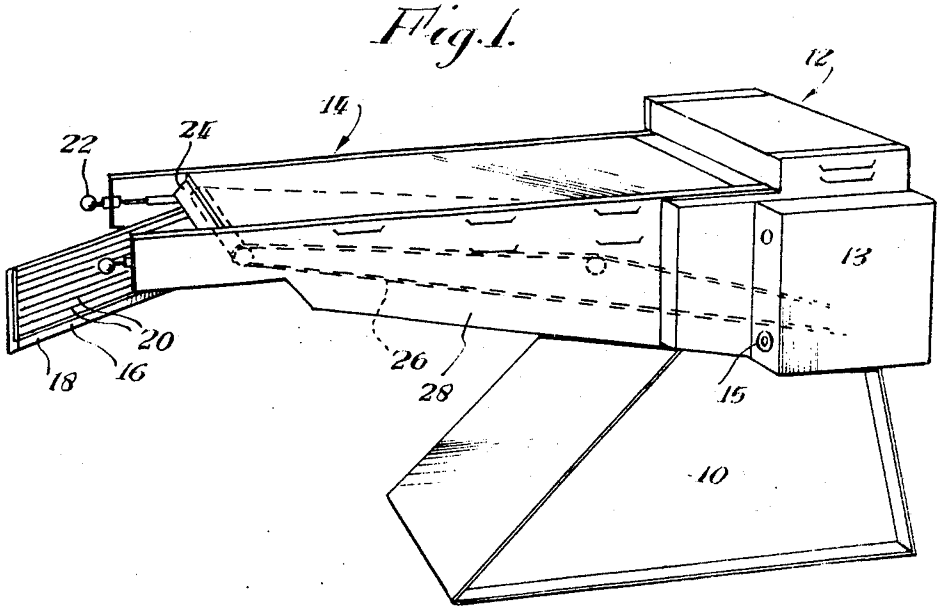
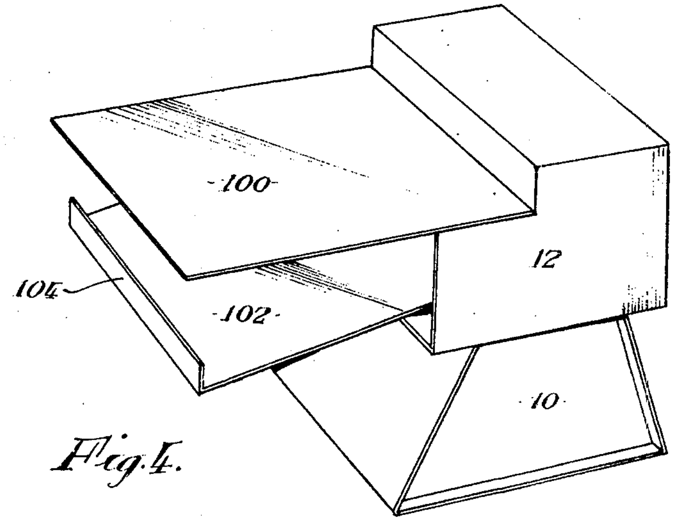
Fig. 4.

TRANSPRINTING, BONDING OR FUSING MACHINES

The present invention relates to a machine wherein materials are subjected to pressure and heat such as is necessary for the processes of transfer printing (hereinafter referred to as transprinting), bonding or fusing and more particularly to said machines where the process can be continuous.

A known type of transprinting, bonding or fusing machine holds the materials to be processed between two moving belts, the complete "sandwich" of belts and materials passing through pressure rollers and between heating elements. The aforesaid machine is fed materials at one end, and outputs the bonded, transprinted or fused product at the other end.

A further known type of transprinting, bonding or fusing machine employs the two moving belts of the first considered type, which entrap the materials to be processed, but conveys the belt-materials "sandwich" past a rotating drum, pressure being established by a pressure roller between which, and the drum, the "sandwich" is squeezed and heat being applied via the drum surface by heating elements within the drum. Materials to be transprinted, bonded or fused are fed in between the belts at one side of the machine the product being output from between the belts at the other side of the machine.

A disadvantage of the prior art machines is that they require two operators, one of whom attends to the input of materials, the other attending to the output of the processed materials on the other side of the machine. A further disadvantage of the prior art machines is that they require two moving belts each having associated guiding and tensioning apparatus. A third disadvantage of the prior art machines is that in order to provide heat on both the top and bottom surface of the materials to be processed, heating has to be provided from inside and outside the drum.

The latter of the two prior art machines discussed above also requires that power is fed to the rotating drum, to operate the heating elements therein, from the stationary machine frame.

It is an object of the present invention to provide a machine suitable for transprinting, bonding, fusing or the like processes, which overcomes partially or wholly some or all of the above mentioned disadvantages of the known machines.

According to the present invention there is provided a machine for the transprinting, bonding or fusing of materials including: a drum arranged for rotation; at least one roller arranged in contact with the surface of the drum; means for applying pressure between said roller and the drum; an endless belt which passes between said pressure roller and said drum and which extends at least part way around the surface of said drum; heating means arranged exterior to the surface of the drum and extending at least a part of the angular distance around the surface of the drum on which said endless belt is in contact; and means for driving said endless belt/drum system so that material to be printed, bonded or fused passes between said endless belt and the surface of the drum.

Preferably the arc through which the endless belt bears on the rotating drum is sufficient to enable material input and output to be on the same side of the machine.

Preferably the heating means comprise a series of electric elements arranged around the circumference of the drum over substantially the whole of the portion of the drum which is contacted by the endless belt.

Preferably means are provided for tensioning said endless belt so that the material to be transprinted, bonded or fused is tightly squeezed between it and the surface of the drum.

The pressure roller is preferably located at the material output end of the drum, the pressure roller being pivotally fixed to the frame of the machine, means being provided for pivotally moving said pressure roller into pressure engagement with the drum. Said pressure engagement of the pressure roller and drum is preferably effected by pneumatic pressure.

The present invention will now be described in greater detail by way of example with reference to the accompanying drawings, wherein:

FIG. 1 is a perspective view of one preferred form of transprinting, bonding or fusing machine;

FIG. 4 shows a perspective view of an alternative type of feed and output arrangements for the material.

Figure 2:
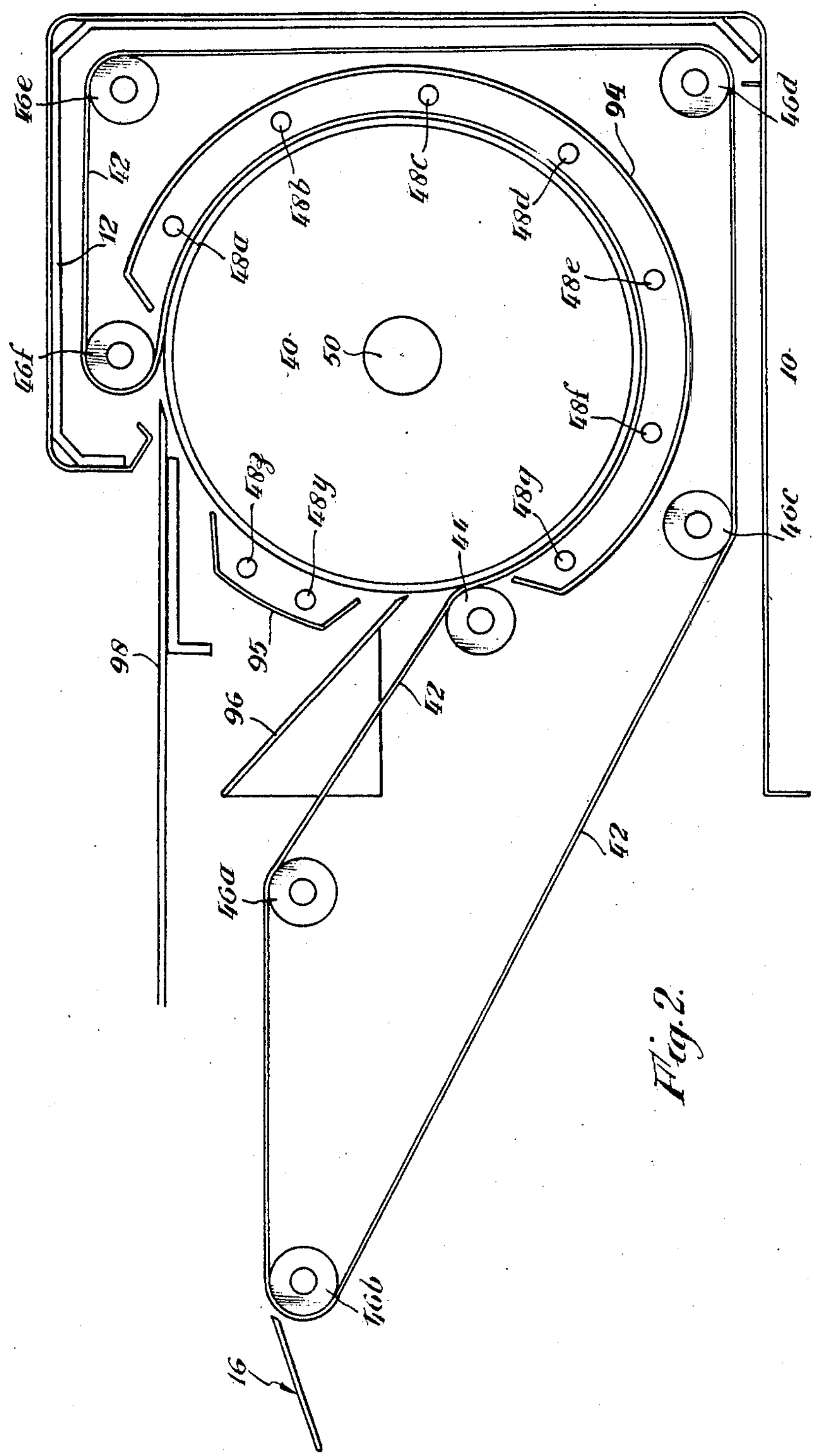
FIG. 2 is a diagrammatic view of the machine showing the general layout of the essential elements.

Referring to FIG. 1 of the drawings, the transprinting, bonding or fusing machine comprises three basic parts, firstly a stand assembly 10, secondly a machine assembly 12 which is mounted thereon, and thirdly a feed/-preparation table and outer conveyor assembly 14 which is secured to the machine assembly 12. A housing 13 secured to the side of the machine assembly 12 contains the electrical control equipment for the machine, the various controls being effected from a control panel 15. As can be seen from FIG. 1 the stand assembly is trapezoidal shaped in outline in order to prevent the whole machine from toppling over due to the weight of the table and conveyor assembly 14. The table and conveyor assembly 14 comprises a conveyor belt section 26, in which the output run of the belt is located from which materials which have been transprinted, bonded or fused can be unloaded by the operator from an off feed tray 16. This belt section 26 is supported by two supporting wing members 28 which are attached to the frame of the machine assembly 12. The two supporting wing members 28 are shouldered or recessed at the upper surface so as to support a plate of glass or smooth surfaced material to act as a feed table for material to be fed into the machine.

The off feed tray 16 is attached to the bearings of the tensioning roller (not shown in FIG. 1). It consists of a frame 18 pivoted at all four corners, having nylon thread 20 stretched 1 inch apart between opposite sides of the frame parallel to the tensioning roller. When the tracking of the belt is adjusted by means of the screw adjustment 22, the angle of the tensioning roller in relation to the machine will change. By pressure on either side of the off feed tray, its shape can be changed from a rectangle to a parallelogram, thus enabling the nylon thread to remain parallel with the sides of the frame 18. Tracking brackets 24 are attached to the tensioning roller bearings to help keep the belt running true.

Figure 3:
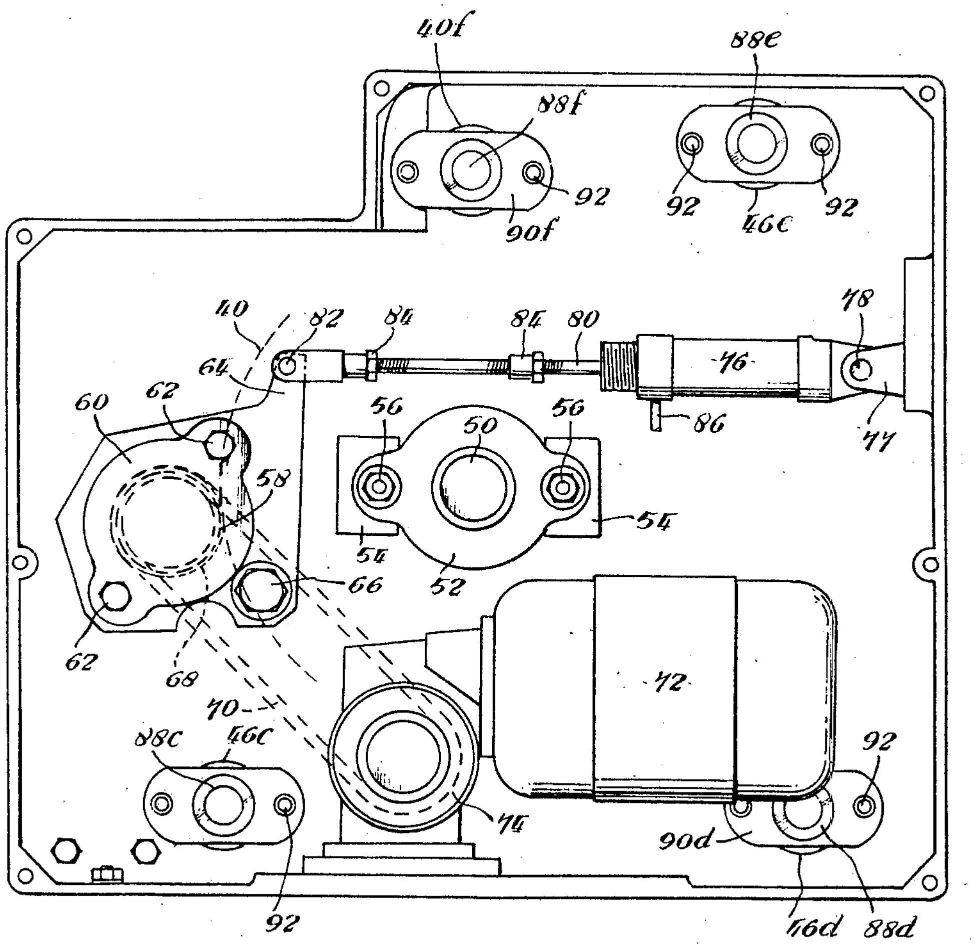
FIG. 3 is a detailed sectional elevation view of part of the machine showing how the pressure is applied to the main drum of the machine.

Referring now to FIGS. 2 and 3, the machine assembly 12 basically includes a rotatable drum 40, an endless polytetrafluorethylene (P.T.F.E.) or canvas material belt 42, a driven pressure roller 44, a plurality of idler rollers 46*a* to 46*f*, and a plurality of heating elements 48*a* to 48*g*. In a modified form one or more of the idler rollers 46*a* to 46*f* (in particular rollers 46*a* and 46*c*) can be replaced by bars over which the belt slides. The drum 40 is mounted on a shaft 50, and centrally located within the machine assembly 12 by means of bearings 52, which are bolted to mounting blocks 54 by bolts 56.

The drum 40 and conveyor belt 42 is driven by means of the pressure roller 44, which makes frictional contact therewith through the belt 42. The pressure roller 44 is silicone rubber coated and is mounted on a shaft 58 which is supported in bearings 60. Each bearing 60 is bolted by means of bolts 62 to a plate 64 which is pivotally mounted to the frame of the machine assembly 12 through bolt assembly 66. The shaft 58 of the pressure roller 44 carries a toothed wheel 68 which engages with an endless driving chain 70.

The chain 70 is driven from an electric motor 72 through a worm gear-box 74. A pneumatic cylinder 76 has one end of its casing pivotally fixed to a flange 77 of the machine casing by a pivot 78. The piston of the cylinder is connected to one end of a rod 80, the other end of which is pivotally secured to the plate 64 at pivot 82. The rod 80 as shown is a composite rod consisting of a number of sections whose overall length can be varied by adjustment of the lock screws 84. A flexible pipe 86 connected to a pneumatic pump (not shown) allows air pressure to act on the piston of the cylinder 76 so as to move the rod 80 to the right (as shown in FIG. 3) and thus pivot the plate 64 about the pivot point 66 in a clockwise direction. An identical plate and cylinder arrangement is provided at the other side of the machine (not shown). Pneumatic operation of the two cylinders pulls the pressure roller 44 into contact with the drum 40 to apply pressure to the drum through the endless conveyor belt 42 for not only ensuring the final bonding action of the material being transprinted, bonded or fused, but also for ensuring that the drum 40 is driven in a clockwise direction as seen in FIG. 3. It will be appreciated that by varying the air pressure to the pneumatic cylinders 76, the amount of pressure applied to the material between the pressure roller 44 and the drum 40 can easily be varied.

In the alternative form, the pneumatic cylinders 76 are replaced by springs which can be tensioned by screw adjustments.

Each of the rollers 46*a* to 46*f* are mounted on respective shafts 88*a* to 88*f*, only four of which (*88c* to *88f*) are shown in FIG. 3. The roller 46*f* acts as a feed roller to grip the material between the belt 42 and the drum 40, for taking it into the machine. The roller 46*b* acts as a tensioning and tracking roller, and is associated with the off feed tray 16. The shafts are mounted in respective bearings 90c to 90*f* which are secured to the frame of the machine assembly 12 by means of bolts 92.

Referring to FIG. 2, the material to be transprinted, bonded or fused, is heated by means of the seven electric heater elements 48*a* to 48*g* arranged outside the drum 40 over an arc of a circle which extends approximately 225° around the circumference of the drum 40. The electric elements 48*a* to 48*g* are tubular in form having their longitudinal axes extending parallel to the axis of the drum 40. It is preferred to use electric elements in which some or all are manufactured so that greater heat is generated at the ends rather than in the centre. Alternatively, any one or more electric elements can be replaced by two shorter hairpin elements which would leave an unheated central zone. The seven heater elements give an approximate power output of 3 KW. Mounted behind the electrical heating elements 48*a* to 48*g* is a heat reflector 94 made of aluminium. The drum surface is heated from the heater elements, the power supply to the heater elements being regulated by means of rheostats or a variac transformer to achieve the required temperature for the particular process. Of course, the surface of the drum 40 and the surface of the pressure roller 44 as well as the belt 42 must be made of heat resistant material.

A pair of additional heater elements 48*y* and 48*z* are provided in a zone where the endless belt 42 does not contact the drum 40. In an alternative form, only one such additional heater element is provided. A heat reflector 95 also made of aluminium is mounted behind the heater elements 48*y* and 48*z*. The purpose of the additional heater elements is to boost the temperature of the surface of the drum 40, so that materials fed into the machine have their underside surfaces heated by the drum 40 and their upper surfaces heated by heat passing through the conveyor belt 42 from the heating elements. Thus, by using the booster heater elements 48*y* and 48*z*, the temperatures on both sides of the material can be substantially equalized.

A scraper 96 ensures that the material does not remain on the drum 40 after having passed between the pressure roller 44 and the drum 40 should there be any tendency for it to stick to the drum after the heat and pressure treatment. This scraper 96 also ensures that the material is safely guided up the inclined portion of the belt 42 to the off feed tray 16.

The material to be transprinted, bonded or fused is fed between the feed roller 46*f* and the drum 40 from a table top 98 made of glass or other smooth surfaced material.

The endless belt 42 is tensioned by means of a screw adjustment 22 provided in association with the tensioning roller 46*b*, whereby the roller 46*b* may be moved horizontally either towards or away from the drum 40 to respectively slacken or increase the tension of the belt 42. Also, the tracking of the belt can be suitably adjusted by means of the screw adjustment 22.

Referring to FIG. 4, an alternative feed and output arrangement for the machine is shown, the transprinting, bonding or fusing machine assembly 12 being shown only in outline together with the stand assembly 10. The machine is provided with a horizontal input feed surface 100 which is preferably smooth surfaced and an inclined off feed tray 102 down which the processed material from the machine will slide. The end of the off feed tray 102 carries a projecting stop or ledge 104 to retain the processed material until removed by the operator. It will be appreciated that with this modified arrangement, the idler roller 46*a* and tensioning roller 46*b* are omitted and the belt 42 on passing around the pressure roller 44 goes directly down and around the idler roller 46*c*. The treated material on passing out from between the drum 40 and the pressure roller 44 moves over the top of the pressure roller 44 and slides directly into the off feed tray 102.

The above described embodiments of transprinting, bonding or fusing machines have the following advantages over the known machines.

a. The material to be processed is fed into and extracted from the same side of the machine, which means that it requires only one operator instead of two, yet still can be used by one, two or three operators if required.

b. Only one endless belt is used in contact with the main drum instead of two.

c. The heating is exterior to the drum instead of inside it as in one prior art machine, which means that maintenance is facilitated.

d. Instead of utilizing separate pressure rollers, pressure on the material for the printing, bonding or fusing process is achieved by at least one of the rollers squeezing the material against the main drum.

e. The heat being provided externally from the drum plus the two booster elements provide heat on both sides of materials fed into the machine, without the necessity to provide heating and power within the drum.

f. The size of the machine is kept to the minimum by the belts passing underneath the feed table rather than a separate system.

g. The material is gripped firmly between the conveyor belt and drum from the point of entry to the point of exit allowing no movement between the material and transfer paper or fusable interlining.

h. The area of belt from the pressure roller to the tensioning roller provides a cooling down zone for hot material.

What I claim and desire to secure by Letters Patent is:

1. A machine for applying material to a piece of material by bonding two pieces of material together or printing a transfer onto a piece of material, comprising a frame; a preparation table supported by the frame, on which the material is laid prior to being fed into the machine; a drum located within said frame and mounted for rotation about a horizontal axis; an endless belt that contacts the surface of said drum and extends at least part way around the surface thereof to form a bonding zone; a pressure roller located within the machine frame at one end of the bonding zone; an idler roller located within the machine frame at the other end of the bonding zone; heating means exterior to the surface of the drum and extending over a substantial part of the bonding zone; means for applying a predetermined constant pressure to said pressure roller to squeeze said belt into frictional contact with the drum; means for rotating said pressure roller thereby to drive the endless belt and the drum into rotation through the frictional contact maintained by the pressure applied to said pressure roller, the direction of rotation being such that said idler roller is at the upstream end of the bonding zone with respect to material fed therein from the preparation table, whilst the pressure roller is at the downstream end of the bonding zone; means for guiding said endless belt in a closed loop outside said bonding zone; a tensioning roller mounted within a framework, said framework supporting the preparation table; manually operated screw adjusting means for altering the position of the tensioning roller, to thereby adjust the tension of the endless belt; and an unload tray comprising a frame pivotably mounted at all four corners, and a series of equi-spaced nylon threads stretched between opposite sides of the frame, said threads being parallel to the axis of rotation of said tensioning roller, whereby as the tracking of the tensioning roller is changed, the effective shape of the tray is altered, thus allowing the nylon threads to remain parallel with the other two sides of the frame.

2. A machine according to claim 1, additionally including a plurality of idler rollers in addition to said first mentioned idler roller, located at the upstream end of the bonding zone; and mounting means on said machine assembly for said idler rollers, whereby said endless belt having passed from the pressure roller to the tensioning roller is returned to the idler roller located at the upstream end of the bonding zone.

3. A machine according to claim 1, wherein the pressure roller comprises a silicone rubber coated roller; a shaft carrying said roller; bearings supporting said shaft; and plates carrying said bearings pivotably mounted at one corner thereof to the machine frame, so as to urge said pressure roller to squeeze said belt between its silicone rubber surface and the surface of the drum.

4. A machine according to claim 3, wherein the means for applying a predetermined constant pressure to said pressure roller comprises a pair of cylinders and pistons, said cylinders being pivotably fixed to the machine frame; a pair of adjustable connecting rods connected between respective pistons and respective plates at a point distant from the pivotable points, at which said plates are mounted on the machine frame; a pneumatic supply means; and a flexible connection between said cylinders and said pneumatic supply means to permit air to act on said pistons, so as to urge them to rotate said pressure roller about its pivotal axis into contact with the endless belt and drum.

5. A machine for applying material to a piece of material by bonding two pieces of material together or printing a transfer onto a piece of material, comprising a frame; a preparation table supported by the frame, on which the material is laid prior to being fed into the machine; a drum located within said frame and mounted for rotation about a horizontal axis; an endless belt that contacts the surface of said drum and extends at least part way around the surface thereof to form a bonding zone; a pressure roller located within the machine frame at one end of the bonding zone; an idler roller located within the machine frame near the other end of the bonding zone; heating means exterior to the surface of the drum and extending over a substantial part of the bonding zone; means for applying pressure to said pressure roller to squeeze said belt into frictional contact with the drum; means for rotating said pressure roller thereby to drive the endless belt and the drum into rotation through the frictional contact maintained by the pressure applied to said pressure roller, the direction of rotation being such that said idler roller is at the upstream end of the bonding zone with respect to material fed therein from the preparation table, whilst the pressure roller is at the downstream end of the bonding zone; means for guiding said endless belt in a closed loop outside said bonding zone; an unload tray supported by the machine frame on the same side of the machine as the preparation table, a scraper located adjacent the drum on the downstream side of the pressure roller, said scraper removing any material from the drum that sticks to the drum after the heat and pressure treatment, and a tensioning roller mounted on said machine frame in close proximity to said unload tray, the belt extending on a part inclined slope underneath said preparation table between said pressure roller and the tensioning roller, said scraper guiding the heat treated material up said inclined slope.

6. A machine according to claim 5, wherein said heating means comprise a series of electric heating elements, which are arranged in equi-spaced relation to one another along substantially the whole length of the bonding zone, between the idler roller at the upstream end thereof, and the pressure roller at the downstream end thereof.

7. A machine according to claim 6, and at least one further electric heating element positioned in a zone between the pressure roller and the idler roller at which the endless belt does not make contact with the drum, and a heat reflector behind said at least one electric element for reflecting heat on to the surface of the drum, whereby the surface of the drum is heated thereby to heat the under surfaces of material entering the bonding zone at the upstream end thereof.

8. A machine according to claim 5, wherein said tray is downwardly inclined away from the pressure roller, and has an upwardly projecting ledge at the lowermost edge to retain the processed material until removed by the machine operator.

* * * * *